US012651843B2

(12) United States Patent
Kashino et al.

(10) Patent No.: US 12,651,843 B2
(45) Date of Patent: Jun. 9, 2026

(54) LENS ANTENNA

(71) Applicant: Panasonic Intellectual Property Management Co., Ltd., Osaka (JP)

(72) Inventors: Yuichi Kashino, Ishikawa (JP); Tomohiro Murata, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 85 days.

(21) Appl. No.: 18/867,328

(22) PCT Filed: Dec. 8, 2022

(86) PCT No.: PCT/JP2022/045332
§ 371 (c)(1),
(2) Date: Nov. 19, 2024

(87) PCT Pub. No.: WO2023/228444
PCT Pub. Date: Nov. 30, 2023

(65) Prior Publication Data

US 2025/0323424 A1 Oct. 16, 2025

(30) Foreign Application Priority Data

May 24, 2022 (JP) ................................ 2022-084541

(51) Int. Cl.
*H01Q 15/08* (2006.01)
*H01Q 15/14* (2006.01)
*H01Q 19/06* (2006.01)

(52) U.S. Cl.
CPC ............. *H01Q 15/08* (2013.01); *H01Q 15/14* (2013.01); *H01Q 19/06* (2013.01)

(58) Field of Classification Search
CPC ........ H01Q 15/08; H01Q 15/14; H01Q 19/06; H01Q 13/02; H01Q 19/062; H01P 3/02
See application file for complete search history.

(56) References Cited

U.S. PATENT DOCUMENTS 6,590,544 B1 * 7/2003 Filipovic ............. H01Q 19/062 343/753
10,992,052 B2 * 4/2021 Kratzenberg .......... H01Q 13/02
2014/0104124 A1 * 4/2014 Chernokalov ......... H01Q 3/245 343/754

FOREIGN PATENT DOCUMENTS

JP 2002-171119 A 6/2002
JP 4199395 B2 12/2008

OTHER PUBLICATIONS

International Search Report dated Feb. 21, 2023 issued in International Patent Application No. PCT/JP2022/045332, with English translation.

* cited by examiner

*Primary Examiner* — Minh Tran
(74) *Attorney, Agent, or Firm* — Rimon P.C.

(57) ABSTRACT

A lens antenna according to one embodiment of the present disclosure comprises: a dielectric substrate; a lens which is formed from a surface that is perpendicular to a flat surface of the dielectric substrate and in a direction along the flat surface, and which is configured to be integrated with a dielectric forming the dielectric substrate; and a first antenna which is located near the perpendicular surface and which forms a first main lobe in the foregoing direction.

4 Claims, 9 Drawing Sheets

Unit : dB

| | Input port A | Input port B |
|---|---|---|
| Case 1 | 0 | 0 |
| Case 2 | -12 | 0 |
| Case 3 | -∞ | 0 |

LENS ANTENNA

CROSS-REFERENCE OF RELATED APPLICATIONS

This application is the U.S. National Phase under 35 U.S.C. § 371 of International Patent Application No. PCT/JP2022/045332, filed on Dec. 8, 2022, which in turn claims the benefit of Japanese Patent Application No. 2022-084541, filed on May 24, 2022, the entire disclosures of which Applications are incorporated by reference herein.

TECHNICAL FIELD

The present disclosure relates to a lens antenna.

BACKGROUND ART

Recently, the use of an antenna apparatus supporting a high-frequency band such as a terahertz band has been studied in a radio communication system or a radar system. In a high-frequency band such as the terahertz band, since the propagation loss in space is greater than the propagation loss in space in a millimeter-wave/microwave band, a high-gain antenna is designed.

Further, in a case where an antenna apparatus supporting a high-frequency band of the terahertz band is mounted on a mobile terminal, a planar and high-gain antenna is designed since it is desired for the mobile terminal to have a slim design.

For example, Patent Literature (hereinafter, referred to as "PTL") 1 discloses a planar lens antenna that achieves high gain by forming a lens by disposing a dielectric via, which is filled with a dielectric with a relative permittivity different from that of a dielectric substrate, in the dielectric substrate that forms a waveguide.

CITATION LIST

Patent Literature

PTL 1

Japanese Patent Application Laid-Open No. 2002-171119

SUMMARY OF INVENTION

However, in manufacture of the planar lens disclosed in PTL 1 for the planar lens antenna disclosed in PTL 1, a via with a small opening diameter is to be filled with a dielectric with a different relative permittivity different from that of the dielectric substrate. Thus, the manufacture is difficult.

Further, since a large number of dielectric vias are disposed to form the planar lens in the planar lens antenna disclosed in PTL 1, the substrate size may increase, which can make it difficult to mount on a mobile terminal.

A non-limiting exemplary embodiment of the present disclosure contributes to providing a lens antenna allowing miniaturization by an easy manufacturing method.

A lens antenna according to one exemplary embodiment of the present disclosure includes: a dielectric substrate; a lens that is formed to extend from a surface of the dielectric substrate in a direction along a substrate plane of the dielectric substrate, the surface being perpendicular to the substrate plane, the lens being formed integrally with a dielectric that constitutes the dielectric substrate; and a first antenna that is positioned near the perpendicular surface and forms a first main lobe in the direction.

According to an embodiment of the present disclosure, since the lens is formed integrally with the dielectric that constitutes the dielectric substrate, it is possible to provide a lens antenna allowing miniaturization by an easy manufacturing method without disposing dielectric vias in the lens.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Hereinafter, embodiments of the present disclosure will be described in detail with appropriate reference to the drawings. However, any unnecessarily detailed description may be omitted. For example, detailed descriptions of already well-known matters and repeated descriptions for substantially the same configuration may be omitted. This is to avoid the unnecessary redundancy of the following description and to facilitate understanding of those skilled in the art.

Note that, the accompanying drawings and the following description are provided so that a person skilled in the art understands the present disclosure sufficiently, and are not intended to limit the subject matters recited in the claims.

RELATED ART

Figure 1A:
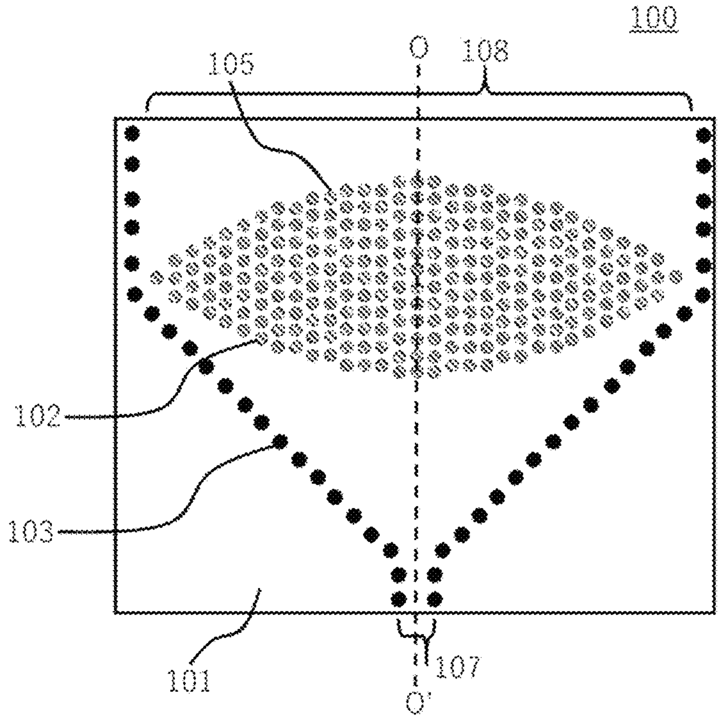
FIG. 1A is a top view illustrating an appearance of a planar lens antenna.
Figure 1B:
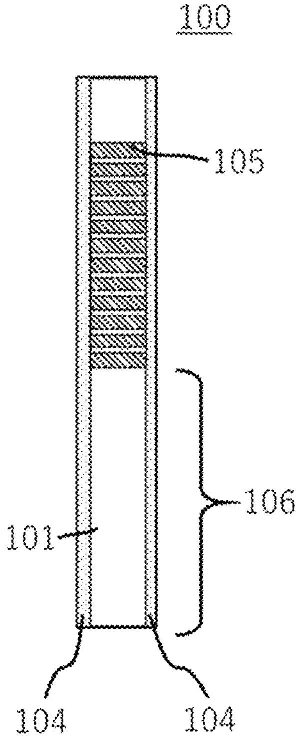
FIG. 1B is a sectional side view illustrating an appearance of the planar lens antenna.

FIGS. 1A and 1B are views illustrating planar lens antenna 100. The planar lens antenna illustrated in FIGS. 1A and 1B is, for example, a planar lens antenna disclosed in PTL 1. FIG. 1B is a sectional side view (O—O' plane sectional view) of planar lens antenna 100 illustrated in FIG. 1A.

As illustrated in FIGS. 1A and 1B, planar lens antenna 100 includes dielectric substrate 101, dielectric vias 102, conductor vias 103, metallized layers (conductor layers) 104, planar lens 105, waveguide 106, input port 107, and output port 108.

In planar lens antenna 100, dielectric substrate 101 has a configuration in which metallized layers 104 formed of a conductor are provided in an up-down direction of a substrate thickness direction. Note that, the illustration of metallized layers 104 is omitted in FIG. 1A.

Conductor vias 103 are arranged (formed) at positions in a tapered shape from input port 107 toward output port 108. Waveguide 106 is formed using dielectric substrate 101, metallized layers 104, and conductor vias 103. Planar lens 105 is configured by disposing dielectric vias 102, which are filled with a dielectric with a relative permittivity different from that of dielectric substrate 101, in a convex shape in a portion of a region of waveguide 106 such that the effective relative permittivity is varied in the portion of waveguide 106.

However, in the configuration illustrated in FIGS. 1A and 1B, since a large number of dielectric vias 102 filled with a dielectric with a relative permittivity different from that of dielectric substrate 101 are disposed, manufacture thereof is difficult. Further, in a case where a large number of dielectric vias 102 are disposed to form a convex shape, the size of dielectric substrate 101 increases due to the need to dispose a large number of dielectric vias 102 while ensuring the minimum clearance between the vias and the via spacing.

Hereinafter, an embodiment related to a lens antenna allowing miniaturization by an easy manufacturing method will be described.

Embodiment

Figure 2A:
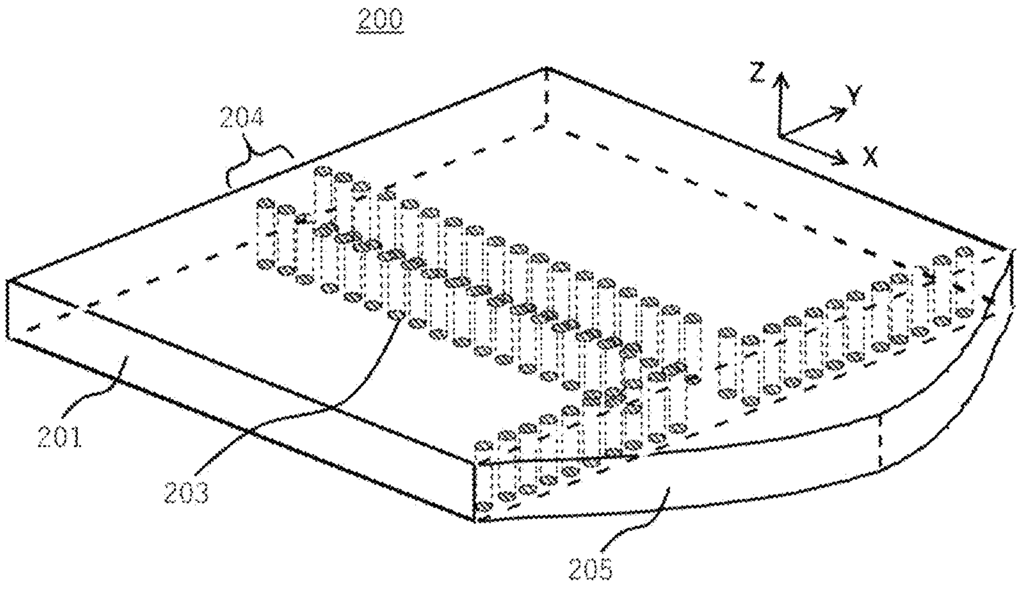
FIG. 2A is a perspective view illustrating a lens antenna according to an embodiment of the present disclosure.
Figure 2B:
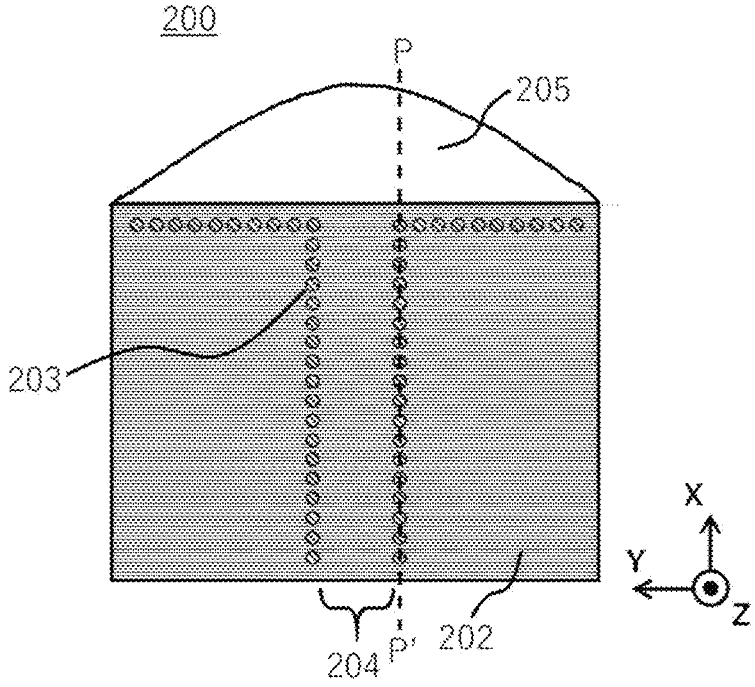
FIG. 2B is a top view illustrating the lens antenna according to an embodiment of the present disclosure.
Figure 2C:
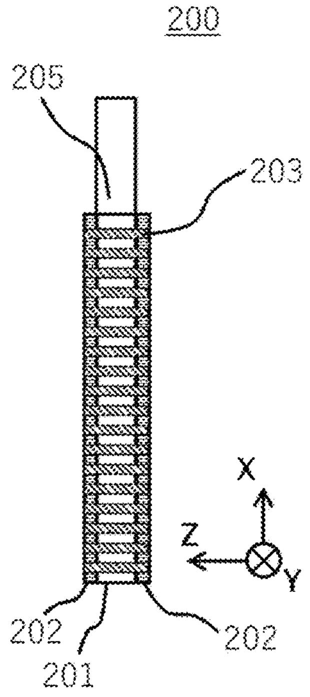
FIG. 2C is a sectional side view illustrating the lens antenna according to an embodiment of the present disclosure.

FIGS. 2A to 2C are views illustrating lens antenna 200 according to an embodiment of the present disclosure. FIG. 2C is a sectional side view (P-P' plane sectional view) of lens antenna 200 illustrated in FIG. 2B. Note that, FIGS. 2A to 2C illustrate X-axis, Y-axis, and Z-axis. The top view illustrated in FIG. 2B illustrates lens antenna 200 as viewed from the positive Z-axis direction, and the side view illustrated in FIG. 2C illustrates lens antenna 200 as viewed from the positive Y-axis direction. Note that, in the present specification, the positive Z-axis direction will be referred to by "upper (direction)," and the negative Z-axis direction will be referred to by "lower (direction)."

As illustrated in FIGS. 2A to 2C, lens antenna 200 includes dielectric substrate 201, metallized layers 202, conductor vias 203, input port 204, and planar lens 205. Note that, the illustration of metallized layers 202 is omitted in FIG. 2A.

Dielectric substrate 201 is, for example, a single-layer double-sided substrate in which metallized layers 202 formed of a conductor are provided on both surfaces of a dielectric, such as Teflon (registered trademark), polyphenylene ether, glass epoxy, or the like.

Conductor vias 203 are disposed (formed) in a direction (substantially) parallel to the X-axis towards planar lens 205 from input port 204. Further, at an end portion of metallized layers 202 in the +X-direction, conductor vias 203 are disposed (substantially) parallel to the Y-axis. As described above, in the present embodiment, conductor vias 203 are disposed in an L-shape with respect to the X-direction and the Y-direction in an XY plane (see FIGS. 2A and 2B).

Metallized layers 202 and conductor vias 203 are electrically connected to each other (conductor vias 203 electrically connects metallized layers 202 provided on both surfaces of the dielectric), and operate as a waveguide. For this reason, the power of, for example, a terahertz band input through input port 204 propagates in the +X-direction, and metallized layers 202 and conductor vias 203 operate as a post-wall horn antenna at or near the end portion of metallized layers 202 in the +X-direction (as will be described later, a surface that is (substantially) perpendicular to the substrate plane of dielectric substrate 201, or near the perpendicular surface), and the post-wall horn antenna forms a main lobe in the +X-direction. For example, the post-wall horn antenna is positioned on or near a surface that is perpendicular to the substrate plane of dielectric substrate 201.

As illustrated in FIG. 2A, a radiation portion aperture of the post-wall horn antenna is defined by metallized layers 202 and conductor vias 203 into a (substantially) rectangular shape. Further, the electromagnetic wave propagated in the +X-direction is radiated in the +X-direction via planar lens 205. Thus, the antenna gain in the +X-direction is improved. The electromagnetic wave radiated at this time will have polarization in the Z-direction.

The post-wall horn antenna is an example of a first antenna according to the present disclosure Metallized layers 202 are an example of a first portion of a metallized layer or a conductor layer according to the present disclosure. Conductor vias 203 are an example of a first portion of a conductor via according to the present disclosure.

Planar lens 205 is formed integrally with the dielectric that constitutes dielectric substrate 201. For example, dielectric substrate 201 includes planar lens 205, which is formed to extend along the substrate plane (XY plane, which is substantially perpendicular to the Z-axis) from the (virtual) substrate end surface of dielectric substrate 201 to the direction (+X-direction), or formed to extend along the substrate plane from a surface (YZ plane), which is (substantially) perpendicular to the substrate plane of dielectric substrate 201 to the direction (+X-direction).

As described above, by forming planar lens 205 with the dielectric that constitutes dielectric substrate 201, it is possible to easily manufacture lens antenna 200, and since it is possible to omit the provision of dielectric vias, lens antenna 200 is capable of being miniaturized.

In the +X-direction that is the direction in which the main lobe is formed (main lobe formation direction), planar lens 205 is disposed (formed) (substantially) symmetrically in the +Y-direction with respect to input port 204 as a center.

Planar lens 205 has a convex shape at the end surface in the +X-direction, where the main lobe is formed, so as to operate as a lens.

Since the convex shape of planar lens 205 can be manufactured by router processing to form the substrate outline, it is possible to omit the addition of a new manufacturing process to the substrate manufacturing process for forming lens antenna 200 according to the present embodiment. By this means, it is possible to easily manufacture planar lens 205, and thus lens antenna 200.

Note that, in the present embodiment, an example in which conductor vias 203 are disposed in an L-shape with respect to the X-direction and the Y-direction has been described, but the present disclosure is not limited thereto. It is sufficient that metallized layers 202 and conductor vias 203 form a waveguide, and for example, conductor vias 203 may be disposed to have a tapered shape toward the +X-direction. Further, in FIGS. 2A and 2B, a large number of conductor vias 203 are disposed parallel to the Y-axis, but as long as the waveguide in which the electromagnetic wave propagates in the +X-direction through metallized layers 202 and conductor vias 203 is formed, there may be no need to dispose conductor vias 203 disposed parallel to the Y-axis.

Further, an example in which planar lens 205 has a convex shape has been described in the present embodiment, but the present disclosure is not limited thereto. For example, planar lens 205 may have a concave shape (may operate as a concave lens).

Figure 3A:
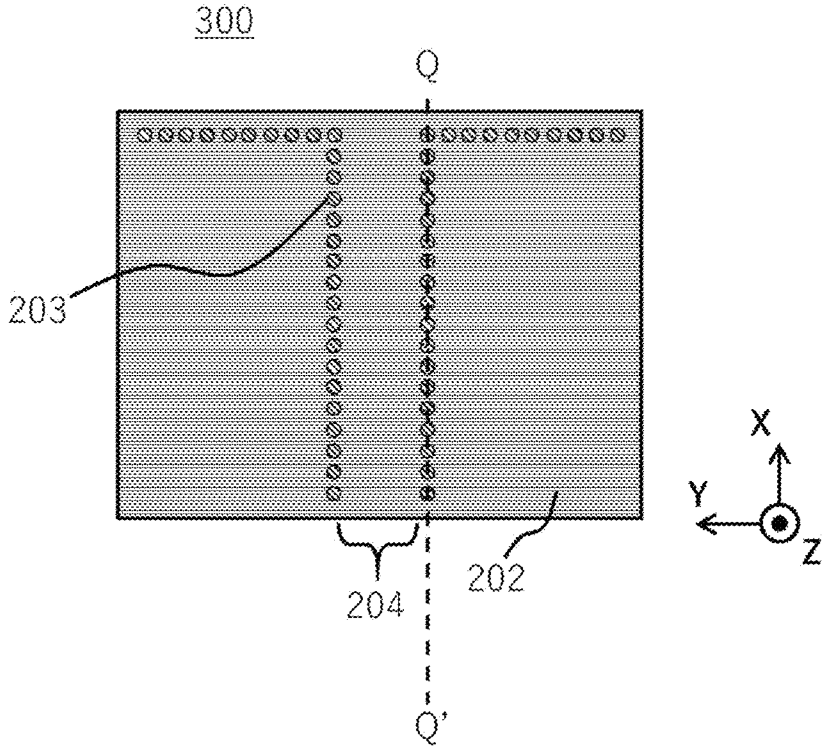
FIG. 3A is a top view illustrating a planar antenna according to an embodiment of the present disclosure.
Figure 3B:
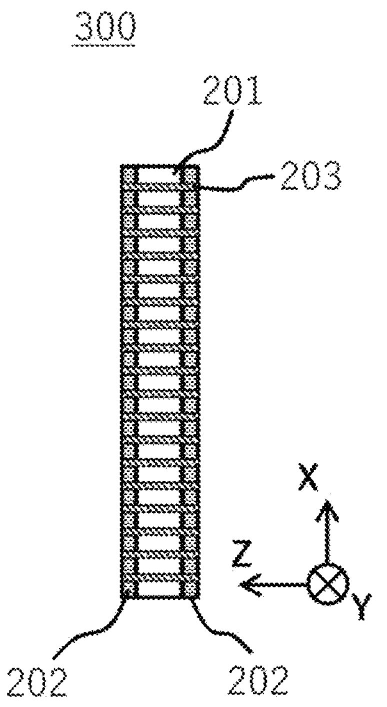
FIG. 3B is a sectional side view illustrating the planar antenna according to an embodiment of the present disclosure.

FIGS. 3A and 3B are views illustrating planar antenna 300 according to the present embodiment. FIG. 3B is a sectional side view (Q-Q' plane sectional view) of planar antenna 300 illustrated in FIG. 3A. Note that, since the configuration of planar antenna 300 is the same as the configuration of lens antenna 200 except that planar lens 205 is not included, the configuration of planar antenna 300 will be omitted.

Hereinafter, directivity patterns of lens antenna 200 and planar antenna 300 will be described.

Figure 4A:
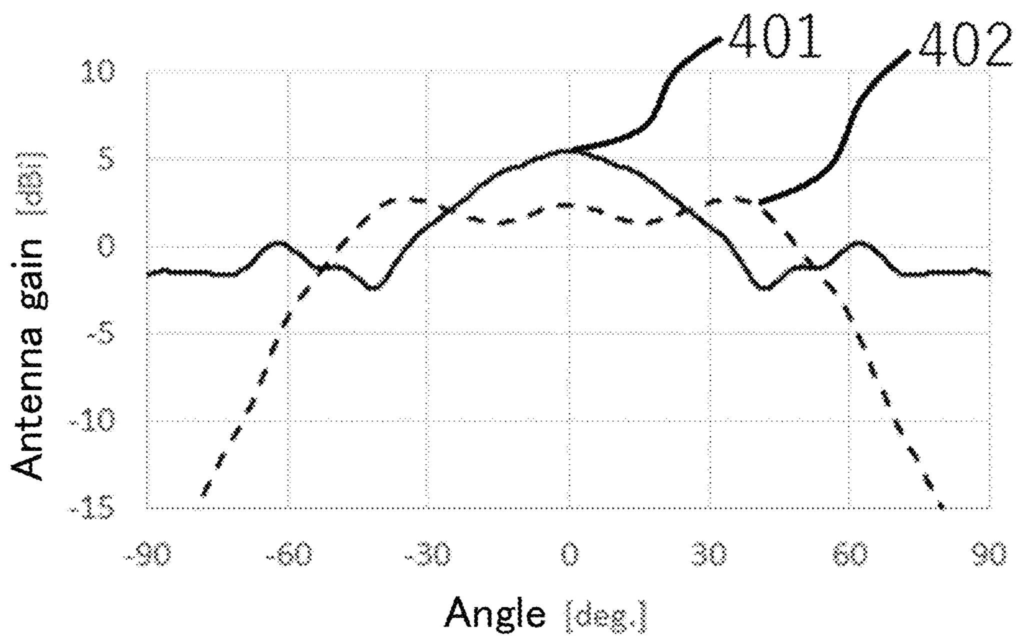
FIG. 4A illustrates an XZ plane directivity pattern of the lens antenna and the planar antenna according to an embodiment of the present disclosure.
Figure 4B:
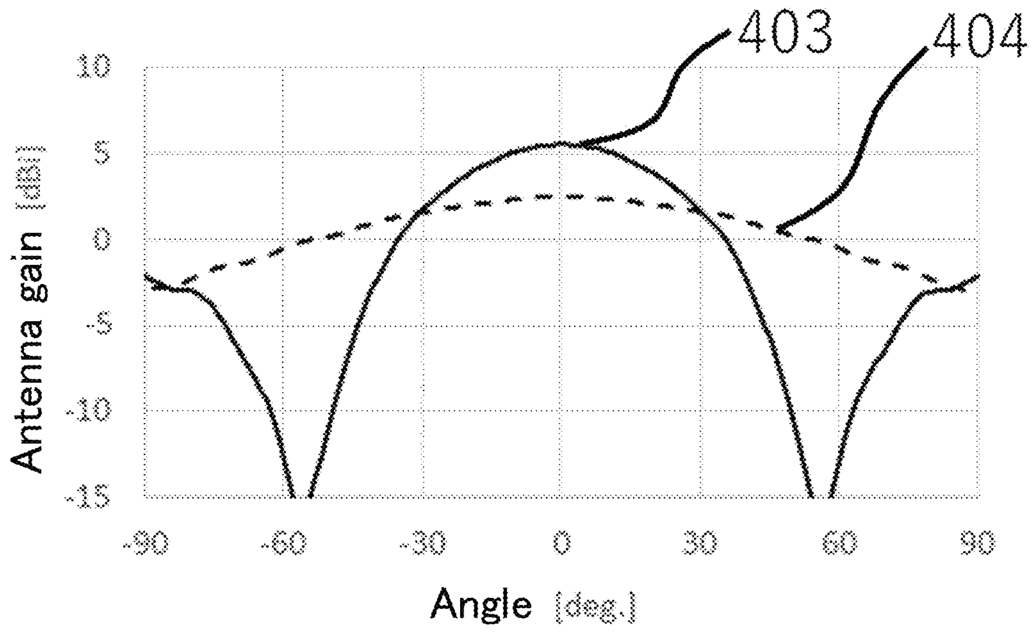
FIG. 4B illustrates XY plane directivity patterns of the lens antenna and the planar antenna according to an embodiment of the present disclosure.

FIG. 4A illustrates the XZ plane directivity patterns of lens antenna 200 and planar antenna 300. FIG. 4B illustrates the XY plane directivity patterns of lens antenna 200 and planar antenna 300. In FIGS. 4A and 4B, the direction of an angle of 0 degrees indicates the +X-direction.

The directivity patterns illustrated in FIGS. 4A and 4B are results of an electromagnetic field simulation using the finite integration method. Note that, the simulation was executed by setting the operating frequency to 300 GHz.

Solid line 401 and solid line 403 illustrated in FIG. 4A and FIG. 4B illustrate the directivity patterns of lens antenna 200, and dashed line 402 and dashed line 404 illustrated in FIG. 4A and FIG. 4B illustrate the directivity patterns of planar antenna 300.

In FIG. 4A and FIG. 4B, in directivity patterns 402 and 404 of planar antenna 300, an antenna gain in the direction of an angle of 0 degrees is approximately 2.5 dBi, whereas in directivity patterns 401 and 403 of lens antenna 200, it can be seen that an antenna gain is approximately 5.5 dBi. As described above, the antenna gain in the direction of an angle of 0 degrees (+X-direction) is improved by providing planar lens 205.

Lens antenna 200 according to the present embodiment described above can be easily manufactured and is capable of being miniaturized, and it is possible to improve the antenna gain.

Variation 1

Figure 5:
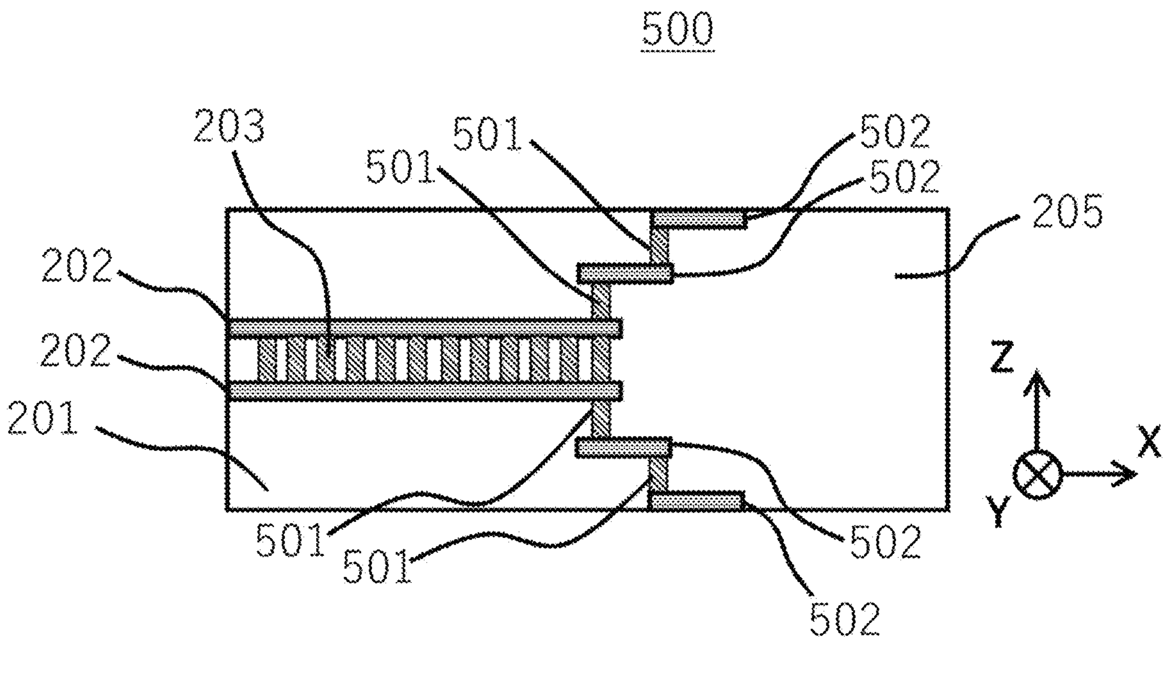
FIG. 5 is a sectional side view illustrating a lens antenna according to Variation 1 of an embodiment of the present disclosure.

In lens antenna 500 illustrated in FIG. 5, components having the same configurations as those of lens antenna 200 illustrated in FIGS. 2A to 2C are assigned the same reference signs, and the description thereof will be omitted.

As illustrated in FIG. 5, lens antenna 500 includes dielectric substrate 201, metallized layers 202, conductor vias 203, input port 204, planar lens 205, horn aperture conductor via 501, and horn aperture metallized layer (conductor layer) 502.

Horn aperture conductor via 501 and horn aperture metallized layers 502 are connected to metallized layers 202 and operate as a ground. Further, horn aperture conductor vias 501 and horn aperture metallized layers 502 are disposed (formed) in a stepped shape with multiple stages in a thickness direction of dielectric substrate 201 from the radiation portion aperture of the post-wall horn antenna along the direction of forming a main lobe. Thus, since the aperture of the post-wall horn antenna gradually widens in the thickness direction of dielectric substrate 201 by disposing horn aperture conductor vias 501 and horn aperture metallized layers 502 in a stepped shape with multiple stages, the antenna gain is further improved compared to lens antenna 200.

Horn aperture conductor vias 501 are an example of a second portion of the conductor via according to the present disclosure. Horn aperture metallized layers 502 are an example of a second portion of the metallized layer or the conductor layer according to the present disclosure.

Variation 2

Figures 6, 7:
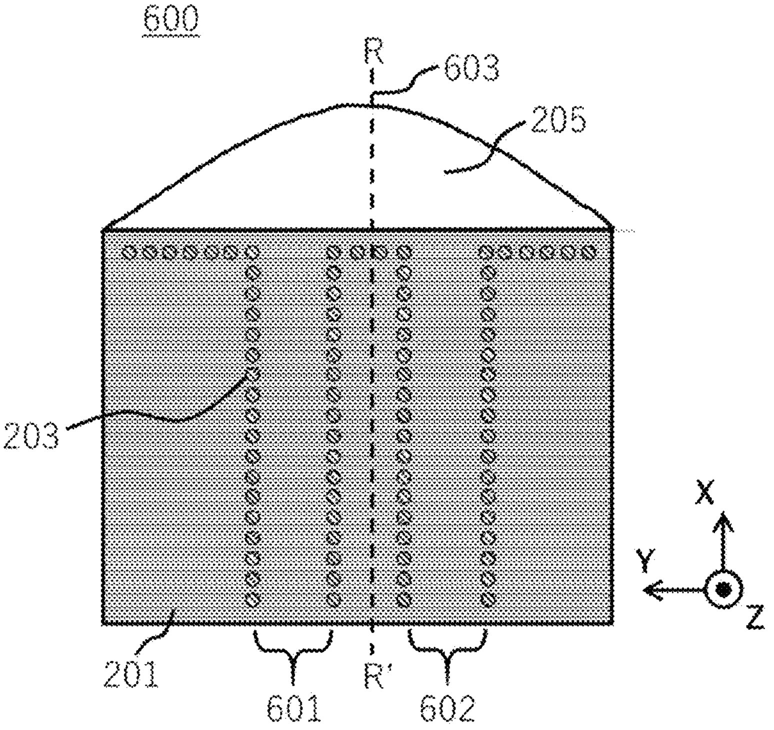
FIG. 6 is a top view illustrating a lens antenna according to Variation 2 of an embodiment of the present disclosure.
FIG. 7 is a view illustrating an example of a part of a case where the amount of power fed to an input port illustrated in FIG. 6 is varied.

In lens antenna 600 illustrated in FIG. 6, components having the same configurations as those of lens antenna 200 illustrated in FIGS. 2A to 2C are assigned the same reference signs, and the description thereof will be omitted.

As illustrated in FIG. 6, lens antenna 600 includes dielectric substrate 201, metallized layers 202, conductor vias 203, input port A 601, input port B 602, and planar lens 205.

In lens antenna 200, one input port is formed, whereas in lens antenna 600, two input ports are formed.

Dashed line R-R' 603 indicates the central line of planar lens 205. The focus of planar lens 205 is present on the line on dashed line R-R' 603. Input port A 601 and input port B 602 are positioned in positions that are shifted in the Y-direction from the line on dashed line R-R' 603, and are (substantially) line-symmetrical with respect to dashed line R-R' 603.

In lens antenna 600, metallized layers 202 and conductor vias 203 operate as a first post-wall horn antenna corresponding to input port A and a second post-wall horn antenna corresponding to input port B, respectively, at or near an end portion of metallized layers 202 in the +X-direction (a surface that is (substantially) perpendicular to the substrate plane of dielectric substrate 201, or near the perpendicular surface), and the first and second post-wall horn antennas form a main lobe in the +X-direction. For example, the first post-wall horn antenna and the second post-wall horn antenna are positioned in the same (virtual) substrate end surface with respect to dielectric substrate 201, or in a surface that is perpendicular to the substrate plane of dielectric substrate 201, or near the perpendicular surface.

The radiation portion apertures of the first post-wall horn antenna and the second post-wall horn antenna are defined in a (substantially) rectangular shape by metallized layers 202 and conductor vias 203, similarly to the post-wall horn antenna of lens antenna 200.

The first post-wall horn antenna is an example of the first antenna according to the present disclosure, and the second post-wall horn antenna is an example of the second antenna according to the present disclosure.

Input port A 601 and input port B 602 (first post-wall horn antenna and second post-wall horn antenna) are connected to a radio (not illustrated), and the radio includes a power controller that controls the feed power to the first post-wall horn antenna and the second post-wall horn antenna.

Figure 8:
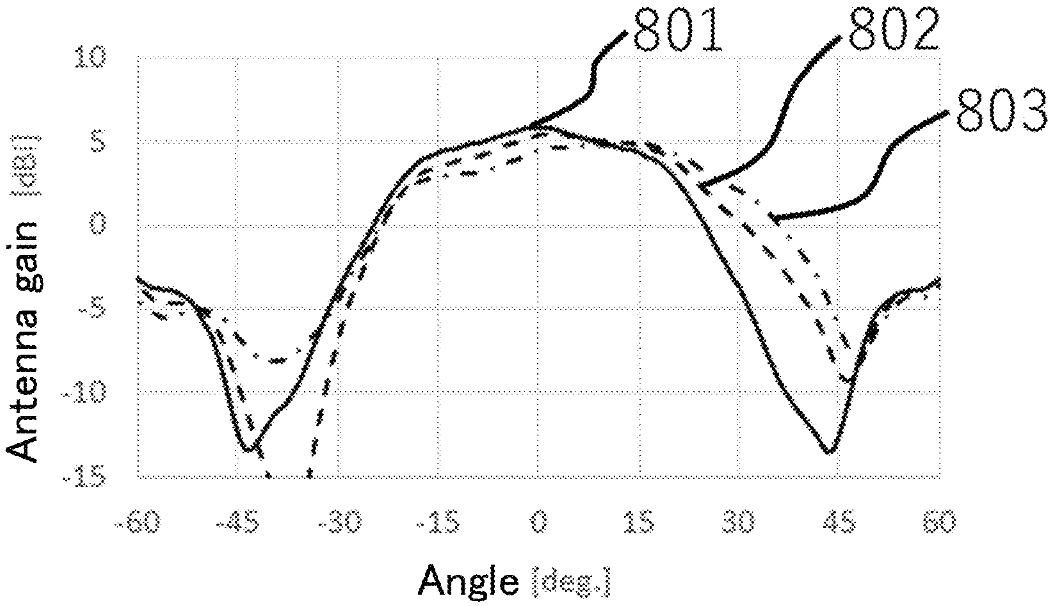
FIG. 8 is a view illustrating an example of analysis results of XY plane radiation patterns of the lens antenna according to Variation 2 of an embodiment of the present disclosure.

FIG. 7 illustrates a part of a case where the amounts of power fed to input port A 601 and input port B 602 are varied. FIG. 8 illustrates the analysis results of the XY plane radiation patterns in each case illustrated in FIG. 7. In the analysis results of the XY plane radiation patterns illustrated in FIG. 8, analysis result 801 for Case 1, analysis result 802 for Case 2, and analysis result 803 for Case 3 are illustrated.

In Case 1 to Case 3 illustrated in FIG. 7, the feed power to input port B 602 is set to 0 dB, whereas the feed power to input port A 601 is set to be low (0 dB, −12 dB, and −00 dB in Case 1 to Case 3, respectively). Accordingly, in the analysis results of the XY plane radiation patterns illustrated in FIG. 8, it is observed that as the feed power to input port A 601 decreases, a peak direction of the radiation pattern tilts in the positive direction.

This is because, by lowering the feed power to input port A 601, equivalently, the position of the radiation source is moved in the −Y-direction from the line on dashed line R-R' 603, which is where the focus of planar lens 205 is positioned, causing the peak direction of the radiation pattern to tilt.

As described above, beam tilt can be achieved by arraying the radiation portion (radiator) and adjusting the gain, and a phase shifter for beam tilting is not required.

In present Variation 2, both the input ports, input port A 601 and input port B 602, are shifted in the Y-direction from the line on dashed line R-R' 603, but as long as at least one input port of input port A 601 and input port B 602 is shifted in the Y-direction from the line on dashed line R-R' 603, the same effects as those in present Variation 2 can be obtained.

Further, present Variation 2 has been described with reference to an example including two input ports, but the present disclosure is not limited thereto. Even in a case where there are three or more input ports, it is possible to obtain the same effects as those in the present embodiment.

Further, present Variation 2 has been described with reference to an example in which input port A 601 and input port B 602 are line-symmetrical with respect to dashed line R-R' 603, but the present disclosure is not limited thereto. There may be no need to dispose input port A 601 and input port B 602 in positions that are line-symmetrical with respect to dashed line R-R' 603.

Variation 3

Figure 9A:
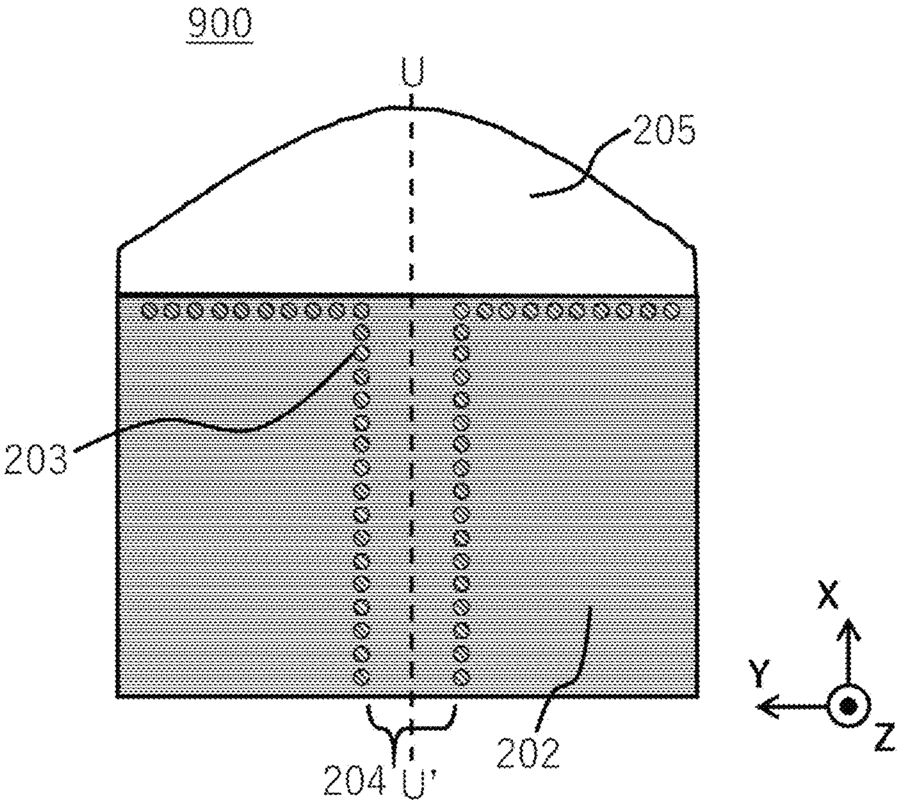
FIG. 9A is a top view illustrating a lens antenna according to Variation 3 of an embodiment of the present disclosure.
Figure 9B:
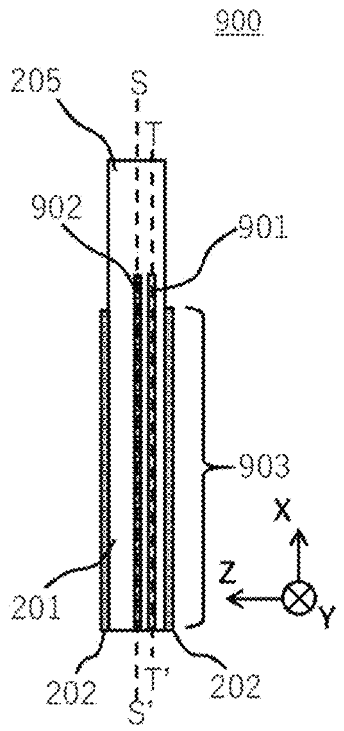
FIG. 9B is a sectional side view illustrating the lens antenna according to Variation 3 of an embodiment of the present disclosure.
Figure 9C:
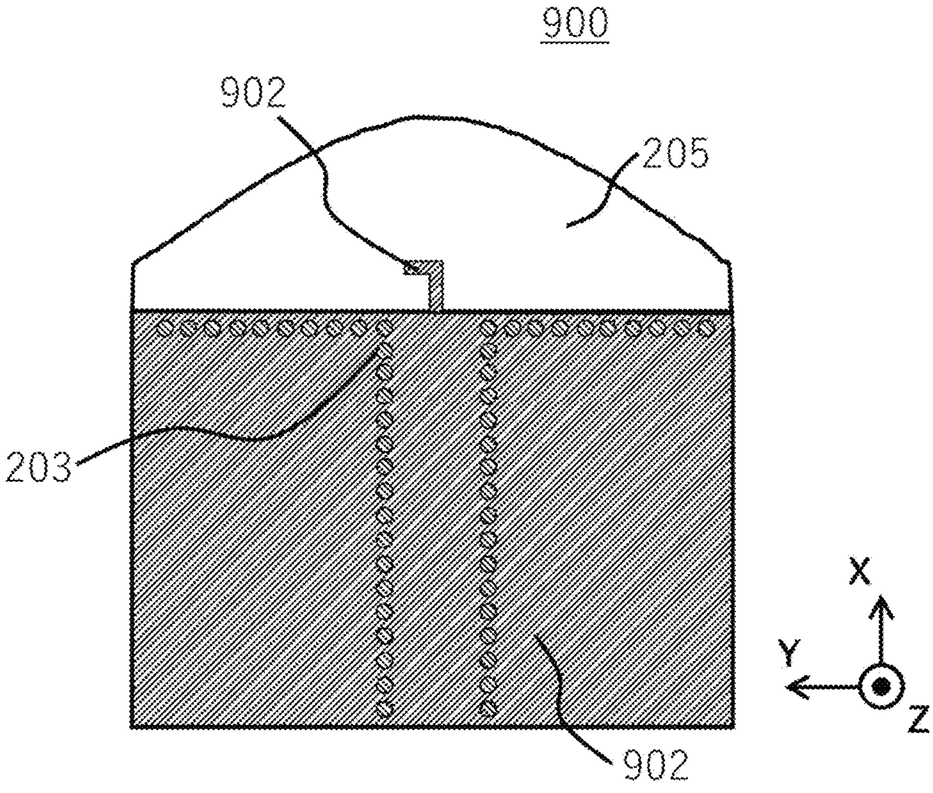
FIG. 9C is a sectional top view illustrating the lens antenna according to Variation 3 of an embodiment of the present disclosure.
Figure 9D:
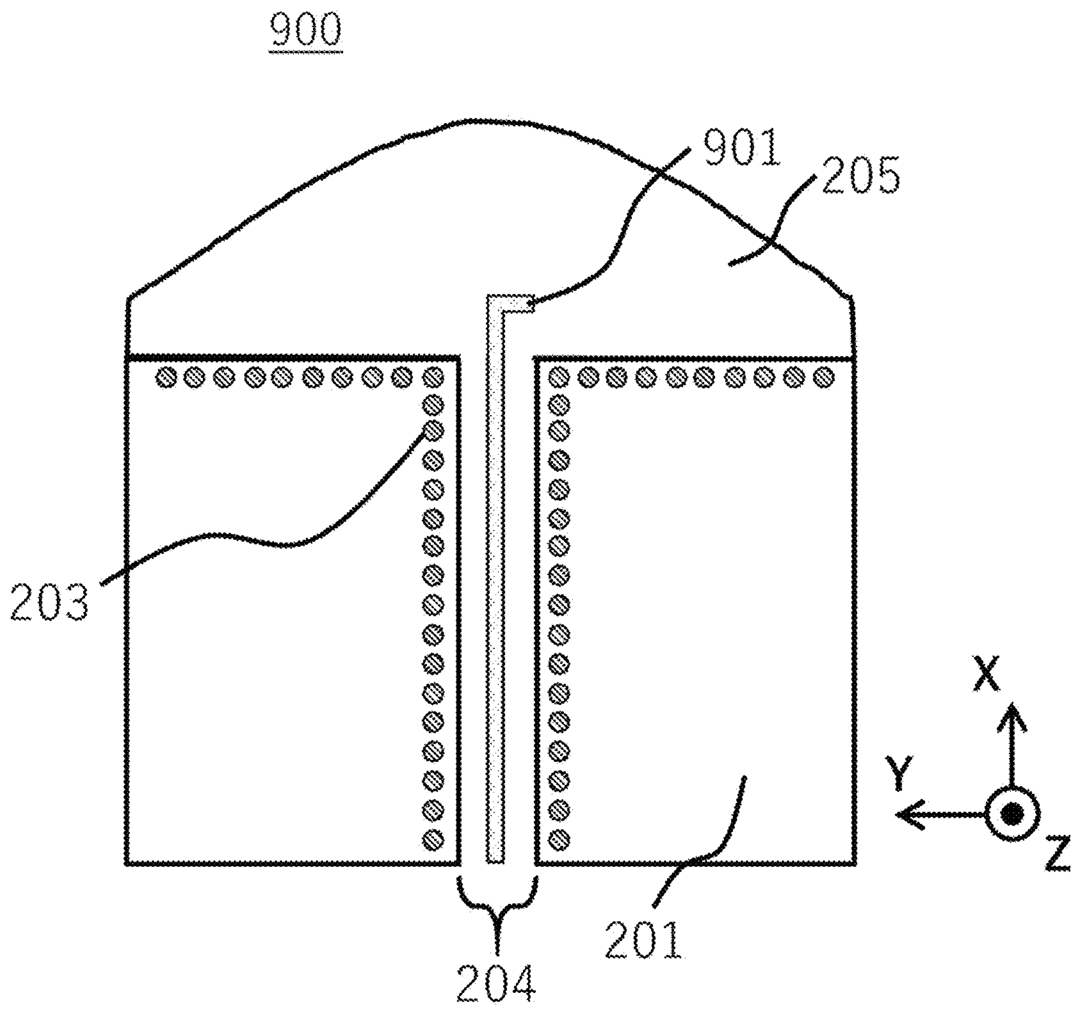
FIG. 9D is a sectional top view illustrating the lens antenna according to Variation 3 of an embodiment of the present disclosure.

FIGS. 9A to 9D are views illustrating lens antenna 900. FIG. 9B is a sectional side view (U-U' plane sectional view) of lens antenna 900 illustrated in FIG. 9A. FIG. 9C is a sectional top view (S-S' plane sectional view) of lens antenna 900 illustrated in FIG. 9B. FIG. 9D is a sectional top view (T-T' plane sectional view) of lens antenna 900 illustrated in FIG. 9B. In lens antenna 900 illustrated in FIGS. 9A to 9D, components having the same configurations as those of lens antenna 200 illustrated in FIGS. 2A to 2C are assigned the same reference signs, and the description thereof will be omitted.

As illustrated in FIGS. 9A to 9D, lens antenna 900 includes dielectric substrate 201, metallized layers 202, conductor vias 203, input port 204, planar lens 205, dipole element 901, and ground element 902.

The power of, for example, a terahertz band fed to input port 204 is fed to dipole element 901. As illustrated in FIG. 9B, in propagation region 903, metallized layers 202 (ground pattern of dielectric substrate 201) on the negative side (right side) of dipole element 901 in the Z-axis direction, dipole element 901 (signal pattern of dielectric substrate 201), and ground element 902 (ground pattern of dielectric substrate 201) operate as an inner-layer triplet line, and the power is propagated in the +X-direction.

Hereinafter, the operating principle of dipole element 901 will be described.

As illustrated in FIG. 9D, dipole element 901 is cranked in an L-shape in the −Y-direction in a region of planar lens 205. The element length of dipole element 901 in the −Y-direction is (substantially) λe/4. Note that, λe represents an effective wavelength considering the wavelength shortening in the dielectric substrate.

On the other hand, as illustrated in FIG. 9B, ground element 902 is cranked in an L-shape in the +Y-direction in the region of planar lens 205. The element length of ground element 902 in the +Y-direction is (substantially) λe/4.

By configuring dipole element 901 and ground element 902 as described above, the total length of dipole element 901 and ground element 902 in the Y-direction is (substantially) λe/2, and dipole element 901 and ground element 902 operate as a dipole antenna (form a radiation portion of the dipole antenna).

The dipole antenna is an example of the first antenna according to the present disclosure.

Further, by setting the distance between, on the one hand, dipole element 901 and ground element 902 and, on the other hand, end portions of metallized layers 202 in the +X-direction to (substantially) λe/4, both of metallized layers 202 operate as reflectors, and the electromagnetic wave, which is radiated from dipole element 901, and the dipole antenna form a main lobe in the +X-direction. The electromagnetic wave radiated at this time will have polarization in the Y-direction.

Further, the electromagnetic wave radiated from dipole element 901 propagates through the portion of planar lens 205, and as illustrated in FIGS. 4A and 4B, the antenna gain in the +X-direction, in which the main lobe is formed, is improved.

Other Variations

The electromagnetic wave radiation portion of the present embodiment is not limited to a post-wall horn antenna illustrated in FIG. 2 or a dipole antenna illustrated in FIG. 9. As long as the antenna forms a main lobe in the direction (+X-direction) in which planar lens 205 is disposed, the same effects as those in the present embodiment can be obtained.

The configurations in the embodiment and variations described above may be appropriately combined. For example, the configuration in Variation 2 may be applied to lens antenna 500 according to Variation 1 and lens antenna 900 according to Variation 3, so as to bring the radiation portion (antenna) in an array form and control the feed power to a plurality of antennas (post-wall horn antenna, dipole antenna, and the like) by the radio.

Effects of the Embodiment

The lens antennas (lens antennas 200, 500, 600, and 900) according to the embodiments include dielectric substrate 201. Each of the lens antenna further includes planar lens 205 that is formed to extend in the direction along the substrate plane of dielectric substrate 201 from a surface of dielectric substrate 201 perpendicular to the substrate plane, and that is formed integrally with a dielectric that constitutes dielectric substrate 201. Further, the lens antenna is positioned near the perpendicular surface and also includes an antenna (a post-wall horn antenna, a dipole antenna, or the like) that forms a main lobe in the aforementioned direction. As described above, by forming the lens integrally with the dielectric that constitutes the dielectric substrate, the lens antenna allows miniaturization by an easy manufacturing method without disposing dielectric vias in the lens. Further, by forming the lens from the surface that is perpendicular to the substrate plane in the direction in which the main lobe is formed, it is possible to improve the antenna gain in the direction.

Summary of Embodiments

A lens antenna according to one exemplary embodiment of the present disclosure includes: a dielectric substrate; a lens that is formed to extend from a surface of the dielectric substrate in a direction along a substrate plane of the dielectric substrate, the surface being perpendicular to the substrate plane, the lens being formed integrally with a dielectric that constitutes the dielectric substrate; and a first antenna that is positioned near the perpendicular surface and forms a first main lobe in the direction.

With this configuration, it is possible to miniaturize the lens antenna by an easy manufacturing method.

In the lens antenna, the lens has a convex shape.

With this configuration, it is possible to improve the antenna gain and the directivity in the direction along the substrate plane of the dielectric substrate.

In the lens antenna, the dielectric substrate includes a conductor layer, and a conductor via for electrical connection of the conductor layer, and a radiation portion aperture of the first antenna is defined by a first portion of the conductor layer and a first portion of the conductor via.

With this configuration, it is possible to improve the antenna gain and the directivity in the direction along the substrate plane of the dielectric substrate.

In the lens antenna, a second portion of the conductor via and a second portion of the conductor layer are formed in a stepped shape in a thickness direction of the dielectric substrate from the radiation portion aperture of the first antenna along the direction.

With this configuration, it is possible to improve the antenna gain and the directivity in the direction along the substrate plane of the dielectric substrate.

The lens antenna further includes a second antenna that is positioned near the perpendicular surface and forms a second main lobe in the direction.

With this configuration, the antennas can be formed as an array.

In the lens antenna, a radio that is connected to the first antenna and the second antenna, and controls feed power to the first antenna and the second antenna.

With this configuration, beam tilt can be achieved by adjusting the gain, and a phase shifter for beam tilting is not required.

The lens antenna further includes a dipole element formed from a signal pattern of the dielectric substrate; a ground element formed from a ground pattern of the dielectric substrate; and a reflector formed from the ground pattern of the dielectric substrate, in which the dipole element and the ground element form a radiation portion of the first antenna.

With this configuration, it is possible to improve the antenna gain and the directivity in a direction along the substrate plane of the dielectric substrate.

Although the embodiments have been described above with reference to the drawings, the present disclosure is not limited to these examples. Obviously, a person skilled in the art would arrive variations and modification examples within a scope described in claims. It is understood that these variations and modifications are within the technical scope of the present disclosure. Moreover, any combination of features of the above-mentioned embodiments may be made without departing from the spirit of the disclosure.

The disclosure of Japanese Patent Application No. 2022-084541, filed on May 24, 2022, including the specification, drawings and abstract, is incorporated herein by reference in its entirety.

INDUSTRIAL APPLICABILITY

An embodiment of the present disclosure is suitable for use in a radio communication apparatus.

REFERENCE SIGNS LIST

200 Lens antenna
201 Dielectric substrate
202 Metallized layer
203 Conductor via
204 Input port
205 Planar lens
500 Lens antenna
501 Horn aperture conductor via
502 Horn aperture metallized layer
600 Lens antenna
601 Input port
602 Input port
900 Lens antenna
901 Dipole element
902 Ground element
903 Propagation region

The invention claimed is:

1. A lens antenna, comprising:

a dielectric substrate;

a lens that is formed to extend from a surface of the dielectric substrate in a direction along a substrate plane of the dielectric substrate, the surface being perpendicular to the substrate plane, the lens being formed integrally with a dielectric that constitutes the dielectric substrate; and a first antenna having a first radiation portion aperture on the perpendicular surface and forms a first main lobe in the direction, wherein the dielectric substrate includes a conductor layer, and a conductor via for electrical connection of the conductor layer, the first radiation portion aperture of the first antenna is defined by a first portion of the conductor layer and a first portion of the conductor via, a second portion of the conductor via and a second portion of the conductor layer are formed in a stepped shape in a thickness direction of the dielectric substrate from the radiation portion aperture of the first antenna along the direction.

2. The lens antenna according to claim 1, wherein the lens has a convex shape.

3. The lens antenna according to claim 1, further comprising:

a second antenna having a second radiation portion aperture on the perpendicular surface and forms a second main lobe in the direction.

4. The lens antenna according to claim 3, further comprising:

a radio that is connected to the first antenna and the second antenna, and controls feed power to the first antenna and the second antenna.

* * * * *